(12) United States Patent
Gailloux et al.

(10) Patent No.: US 9,014,662 B1
(45) Date of Patent: Apr. 21, 2015

(54) PRE-PAID PHONE CASH WALLET

(75) Inventors: Michael A. Gailloux, Overland Park, KS (US); Lauren Ricardo St. Aubyn King, Somerset, NJ (US)

(73) Assignee: Sprint Communications Company L.P., Overland Park, KS (US)

( * ) Notice: Subject to any disclaimer, the term of this patent is extended or adjusted under 35 U.S.C. 154(b) by 396 days.

(21) Appl. No.: 13/532,568

(22) Filed: Jun. 25, 2012

(51) Int. Cl.
*H04M 11/00* (2006.01)
*H04W 4/24* (2009.01)

(52) U.S. Cl.
CPC ...................................... *H04W 4/24* (2013.01)

(58) Field of Classification Search
USPC ........... 455/406.2, 408; 705/16, 14.64, 26.43; 379/114.01, 114.2
See application file for complete search history.

(56) References Cited

U.S. PATENT DOCUMENTS

| | | | |
|---|---|---|---|
| 7,711,638 B2 | 5/2010 | Michelsen et al. | |
| 8,249,965 B2 | 8/2012 | Tumminaro | |
| 8,924,287 B1 | 12/2014 | Gailloux et al. | |
| 2002/0138424 A1 | 9/2002 | Coyle | |
| 2003/0026404 A1* | 2/2003 | Joyce et al. | 379/144.01 |
| 2003/0167237 A1 | 9/2003 | Degen et al. | |
| 2005/0209958 A1 | 9/2005 | Michelsen et al. | |
| 2006/0019632 A1 | 1/2006 | Cunningham et al. | |
| 2007/0011089 A1 | 1/2007 | DeSchryver | |
| 2007/0244811 A1 | 10/2007 | Tumminaro | |
| 2007/0255620 A1 | 11/2007 | Tumminaro et al. | |
| 2009/0319425 A1 | 12/2009 | Tumminaro et al. | |
| 2011/0251906 A1* | 10/2011 | Loevenguth et al. | 705/16 |

OTHER PUBLICATIONS

Office Action—Restriction Requirement dated Sep. 18, 2012, U.S. Appl. No. 13/213,047, filed Aug. 18, 2011.
Office Action dated Dec. 27, 2012, U.S. Appl. No. 13/213,047, filed Aug. 18, 2011.
Final Office Action dated Apr. 26, 2013, U.S. Appl. No. 13/213,047, filed Aug. 18, 2011.
Advisory Action dated Jun. 26, 2013, U.S. Appl. No. 13/213,047, filed Aug. 18, 2011.
Notice of Allowance dated May 22, 2014, U.S. Appl. No. 13/213,047, filed Aug. 18, 2011.

* cited by examiner

*Primary Examiner* — Nimesh Patel

(57) ABSTRACT

A pre-paid mobile phone cash wallet system. The system comprises a processor, a memory, and an application stored in the memory. When executed by the processor, the application receives an initiation message of a pre-paid mobile phone cash wallet, wherein the initiation message identifies a pre-paid wireless communication account, an amount of money presented, and a wallet initiation agent, creates the wallet, where a funds balance of the wallet initially comprises at least a portion of the amount of money presented, persists an association between the wallet and the wallet initiation agent in a memory, and determines a monetary reward for the wallet initiation agent.

19 Claims, 8 Drawing Sheets

PRE-PAID PHONE CASH WALLET

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users of portable electronic devices may utilize a variety of different services such as web services or other data services, voice call services, and short message service (SMS—also known as text messaging). These services may be offered by a communication service provider of portable electronic devices. Service providers may offer one or more of phone service, internet service, text messaging service, and/or other portable electronic device communication services, and may bundle more than one of these services. The bundle of services may be referred to as a service plan or device plan. The device plan may be provided as a post-pay billing system, such that a user is billed for services already provided. For example, a user may be billed at the end of a month for the services they have used in that month. Alternatively, services may be prepaid, such that a user pays for an amount of service, which may be applied as a credit to the user's account. The user may then utilize the service until the amount of prepaid service is consumed. Then, if desired, the user may buy additional service credit in a variety of increments or units. A data plan, for example, may be purchased as a number of bits or unlimited data for a specified period of time.

SUMMARY

In an embodiment, a pre-paid mobile phone cash wallet system is disclosed. The system comprises a processor, a memory, and an application stored in the memory. When executed by the processor, the application receives an initiation message of a pre-paid mobile phone cash wallet, wherein the initiation message identifies a pre-paid wireless communication account, an amount of money presented, and a wallet initiation agent, creates the wallet, where a funds balance of the wallet initially comprises at least a portion of the amount of money presented, persists an association between the wallet and the wallet initiation agent in a memory, and determines a monetary reward for the wallet initiation agent.

In an embodiment, a method of maintaining a pre-paid mobile phone cash wallet is disclosed. The method comprises receiving by a computer an initiation message from a wallet initiation agent, wherein the initiation message identifies a pre-paid phone wireless communication account and an amount of money to be credited to the pre-paid mobile phone cash wallet funds, establishing by a computer a pre-paid mobile phone cash wallet account in a cash wallet data store, where the pre-paid mobile cash wallet account has an initial funds balance equal to the amount of money identified in the initiation message, and creating by a computer in the cash wallet data store an association between the pre-paid mobile phone cash wallet account and the wallet initiation agent. The method further comprises transmitting by a computer a pre-paid mobile phone cash wallet account number to the wallet initiation agent, receiving by a computer a cash load message from a loading agent, wherein the cash load message identifies the pre-paid mobile phone cash wallet account number and an amount of money to load to the pre-paid mobile phone cash wallet funds, determining by a computer the identity of the wallet initiation agent associated with the pre-paid mobile phone cash wallet account number provided in the cash load message by accessing the cash wallet data store, and determining by a computer a monetary reward associated with the cash load message to the wallet initiation agent.

In an embodiment, a method of performing a commercial transaction using a pre-paid mobile phone cash wallet is disclosed. The method comprises receiving by a computer a transaction message, wherein the transaction message comprises a pre-paid mobile phone cash wallet account number, an identity of a business, and a transaction amount, identifying by a computer a wallet initiation agent associated with the pre-paid mobile phone cash wallet account number by accessing a cash wallet data store based on the pre-paid mobile phone cash wallet account number, and determining by a computer a monetary reward for the wallet initiation agent based on the transaction amount.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
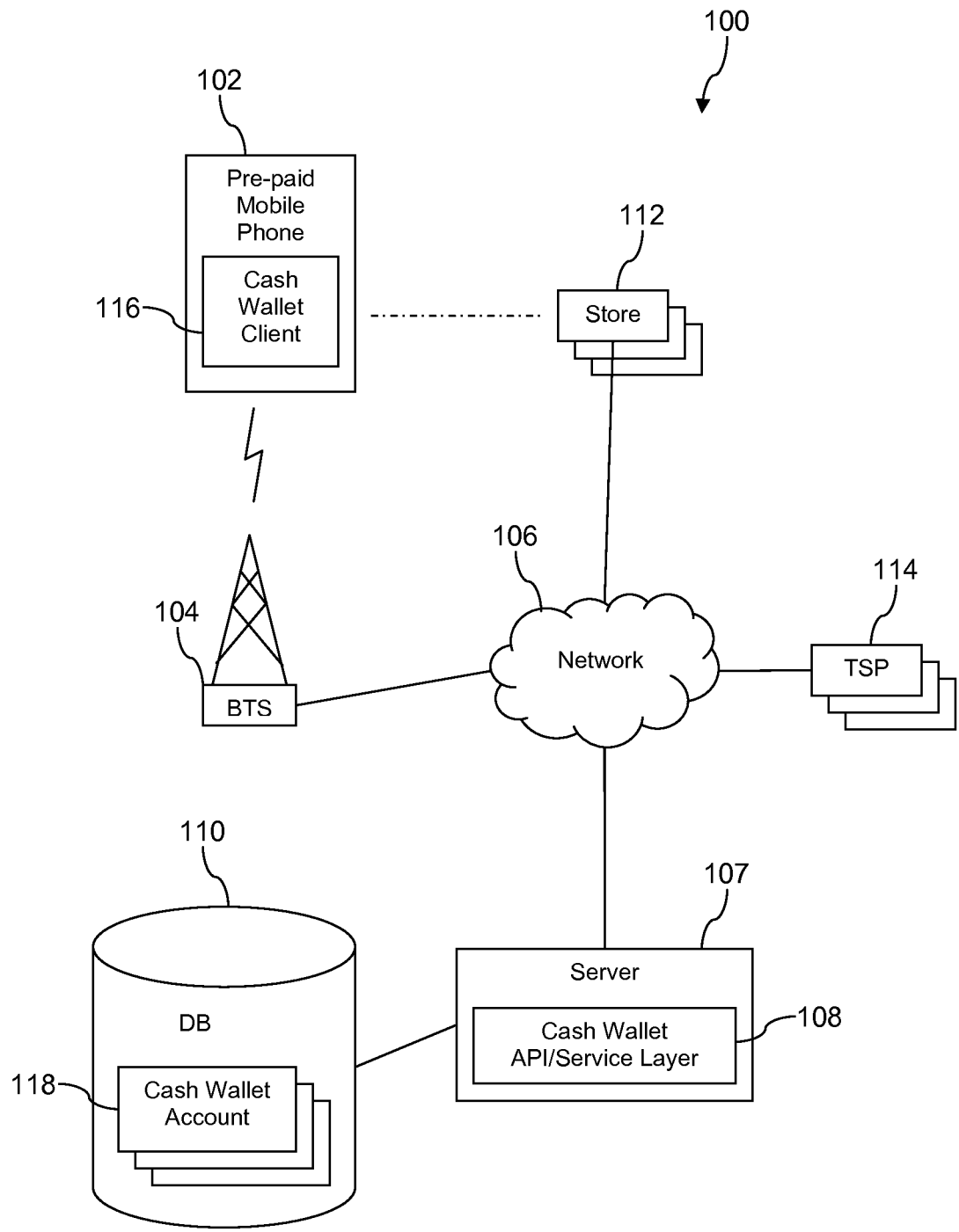
FIG. 1 is a block diagram of a pre-paid mobile phone cash wallet system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment a pre-paid mobile phone cash wallet system is disclosed. The pre-paid mobile phone marketplace may provide mobile communication services to many customers with limited financial resources and who may not have banking accounts such as checking accounts, savings accounts, and/or credit card accounts. Such customers may be unable to make on-line payments and/or make debit card transactions. The pre-paid mobile phone cash wallet system disclosed herein may enable such customers to make on-line purchases and/or complete electronic payment with participating affiliates.

The pre-paid mobile phone may be associated with a pre-paid mobile phone service account that was opened with the assistance of a pre-paid account initiation agent. A pre-paid balance may be associated with the service account such that as the pre-paid subscriber uses his or her pre-paid wireless communication service, the pre-paid funds balance decrements. When the pre-paid funds balance decrements to zero, wireless communication service will no longer be provided to the subject pre-paid mobile phone under normal circumstances (emergency calls may be carried even for pre-paid mobile phones having a zero pre-paid funds balance). The user may add new funds or top up the pre-paid funds balance, for example by performing a top-up transaction with the pre-paid initiation agent or another agent.

A customer having a pre-paid mobile phone may open a cash wallet account associated with but distinct from the pre-paid mobile phone service account. For example, a pre-paid mobile phone service account funds balance may be independent from a funds balance associated with the cash wallet account. The opening of the cash wallet account is facilitated by a wallet initiation agent, for example a pre-paid mobile phone dealer or other retailer. It may be the case that the pre-paid account initiation agent is identical with the wallet initiation agent, but the two need not be the same agents. The wallet initiation agent receives a cash payment from the customer, receives an identity of the pre-paid mobile phone service account, takes any information useful to the opening of the cash wallet, and transmits an initiation message to a cash wallet application programming interface (API)/service layer application that may execute on a server computer in the mobile communication service provider enterprise network. The initiation message indicates the associated pre-paid mobile phone service account and an initial funds balance for the cash wallet. The initial funds balance may be less than the cash payment received from the customer, for example when a cash wallet initiation fee is charged to the customer.

The process of initiating the cash wallet may comprise downloading and installing a cash wallet client or application onto the pre-paid mobile phone, for example via a short range wireless communication technology such as WiFi or Bluetooth® or via a cellular wireless communication protocol. The cash wallet client may comprise a user interface for requesting a report of the current funds balance of the cash wallet and to complete one or more cash transactions. For example, the user interface may provide a control for initiating a cash transfer, for example a cash transfer from the cash wallet account of a working man to the man's retired mother's bank account in a distant city or in another country. The user interface may provide a control for paying utility bills from the cash wallet account. The user interface may provide a control for sending flowers to others. The user interface may update over-the-air from the cellular wireless network with different controls for completing different cash purchase transactions according to seasonal schedules aligned with festivals or holidays. The controls may be provided by the cash wallet client as transaction widgets that are presented on the user interface.

The process of initiating the cash wallet also comprises creating a pre-paid mobile phone cash wallet account as an entry in a data store. The cash wallet account may comprise a cash wallet account number, a funds balance, the identity of the initiation agent, and the pre-paid mobile phone account number. The cash wallet account number is transmitted back to the initiation agent for updating into the cash wallet client as well as to provide to the user. An optional personal identification number (PIN) may be provided to the user by the initiation agent also.

As transactions are made using the cash wallet, a portion of the transaction cost is absorbed by paying a monetary reward to the wallet initiation agent, thereby incenting the wallet initiation agents generally to promote pre-paid mobile phone customers opening the cash wallet accounts. When the pre-paid account initiation agent is the same as the wallet initiation agent, the pre-paid account initiation agent is incented to market the pre-paid mobile cash wallet to the customer. The monetary reward may be a fixed, constant value per transaction. Alternatively, the monetary reward may be a percentage of the transaction value. When the customer wishes to refill the funds balance in his or her cash wallet, the customer presents cash to a loading agent. A cash load fee is levied upon the cash loading transaction, part of which is given to the loading agent and part of which is given to the wallet initiation agent and/or to the prepaid account initiation agent. In some loading scenarios, the loading agent may also be the wallet initiation agent and/or the pre-paid account initiation agent. The loading agent transmits a loading message to the cash wallet application programming interface/service layer application that identifies the amount of the cash load and the wallet cash account. The cash wallet application programming interface/service layer application allocates the appropriate value of cash to the cash wallet funds balance and distributes the appropriate loading monetary reward to the wallet initiation agent and/or to the pre-paid account initiation agent. The loading agent may take his or her share directly out of the cash presented by the customer.

In an embodiment, both transaction monetary rewards and loading cash shares may be accumulated and distributed to the initiation agents and others on periodic settlement intervals, for example, at the end of a business day, at the end of a week, at the end of a month, at the end of a quarter, or on some other time interval. In an embodiment, information about the transactions and the loading events are stored in a data store and processed in a batch immediately before settlement time. Batch processing may promote distributing a load on computers that support the described system more efficiently. For example, the batch processing may be done during periods of low transaction processing times, such as early morning.

The customer may pay for transactions with affiliates by presenting the cash wallet account number and the optional PIN. Alternatively, an electronic card may be provided in association with the cash wallet account that may be used to identify the cash wallet account number, with the customer still providing the PIN. Alternatively, the electronic card may store funds electronically in the card itself, for example as a debit card. Some transactions, for example, funds transfer, may be performed by the pre-paid mobile phone, for example via the user interface of the cash wallet client. In an embodiment, the cash wallet client may promote transferring cash from the funds balance of the cash wallet account to the pre-paid communication account funds balance. A monetary reward or residual may be determined and distributed to the wallet initializing agent on based on these transactions. In an embodiment, a monetary reward or residual may be determined and distributed to the pre-paid account initializing agent based on these transactions.

Turning now to FIG. 1, a pre-paid cash wallet system 100 is described. In an embodiment, the system 100 comprises a pre-paid mobile phone 102, a base transceiver station (BTS) 104, a network 106, a server computer 107, a cash wallet application programming interface (API)/service layer 108, a data store 110, a plurality of stores 112, and a plurality of trusted service providers (TSPs) 114. The network 106 may comprise one or more public networks, one or more private networks, or a combination thereof. The stores 112 may comprise any number of pre-paid mobile phone retail stores, product stores, on-line stores, money transfer services, utility service providers, and other stores. In some contexts the stores 112 may be referred to as businesses. The base transceiver station 104 provides a wireless communication link to the phone 102 and connectivity there through to the network 106 to conduct pre-paid communications such as voice and/or data communication. In an embodiment, the base transceiver station 104 communicates with the phone 102 according to one of a code division multiple access (CDMA), global system for mobile communications (GSM), long term evolution (LTE), worldwide interoperability for microwave access (WiMAX) or other cellular wireless communication protocol. It is understood that the system 100 may comprise any number of pre-paid mobile phones 102, base transceiver stations 104, stores 112, and trusted service providers 114.

The cash wallet API/service layer 108 may be one or more computer programs and/or applications that execute on the server computer 107. Computers are described in more detail hereinafter. The data store 110 comprises a plurality of cash wallet accounts 118. The data store 110 may comprise a data base, a lightweight directory access protocol (LDAP) data store, one or more flat files, or some other structure of aggregated data. In some contexts the data store 110 may be referred to as a cash wallet data store. A cash wallet account 118 may take on any of a variety of implementations and is an abstraction for the collectivity of information that is pertinent to a cash wallet account. The cash wallet account 118 is discussed further below with reference to FIG. 2.

A representative scenario for initiating and using the pre-paid mobile phone cash wallet is now described. It is understood that the present disclosure contemplates a number of alternatives and variations to this representative scenario. A user who has a pre-paid mobile phone service account may visit a store 112, for example a pre-paid mobile phone store, to purchase additional pre-paid communication service, e.g., to top-up their pre-paid mobile phone funds balance. The pre-paid mobile phone store may be referred to in some contexts as a dealer or a dealer store. Any employee of the dealer store may be referred to as a dealer or the dealer in some contexts herein. After the dealer has received the user's cash and topped up the user's pre-paid mobile phone funds balance, the dealer may further persuade the user to set-up a pre-paid mobile phone cash wallet for the pre-paid mobile phone 102. The dealer may be the same business as the business that initialized the pre-paid mobile phone service for the subject pre-paid mobile phone 102.

The user may provide cash to the store 112 to initiate the cash wallet for the phone 102. The store 112 may install a cash wallet client 116 on the pre-paid mobile phone 102, for example a cash wallet client application. The store 112 may further send an initiation message to the server 107 and the cash wallet API/service layer 108 via the network 106. In an embodiment, the store 112 may be associated with one of the trusted service providers 114, and the trusted service provider 114 may relay the initiation message from the store 112 to the server 107 and the API/service layer 108. The role of the trusted service provider 114 in this initiation transaction may comprise performing automated clearing house (ACH) functions.

A portion of the cash provided by the user may be designated for deposit in a pre-paid mobile phone cash wallet funds balance, and another portion of the cash provided by the user may be designated as a monetary reward for the store 112 or dealer that initiates the pre-paid mobile phone cash wallet. In an embodiment, the store 112 may take its monetary reward directly from the customer at the time cash is rendered. Alternatively, in another embodiment, all of the tendered cash is transferred to the cash wallet API/service layer 108, and the monetary reward to the store 112, in this scenario the dealer, is transferred to an account associated with the store 112 at a settlement time.

The store 112 and/or dealer that mediates the set-up and/or initiation of the pre-paid mobile phone cash wallet is referred to as the wallet initiation agent in some contexts herein. The store 112 and/or dealer that mediates the set-up and/or initiation of the pre-paid mobile phone service may be referred to as the pre-paid account initiation agent. In response to receiving the initiation message, the cash wallet API/service layer 108 creates a cash wallet account 118 in the data store 110. The cash wallet API/service layer 108 associates a cash wallet account number with the cash wallet account 118 and establishes a cash wallet funds balance for the cash wallet account 118 based on the cash that is tendered by the customer. The cash wallet account number is transmitted back to the dealer, and the dealer configures the cash wallet client with the cash wallet account number. The dealer may also inform the user of the cash wallet account number. An optional PIN may also be provided to the user.

The pre-paid mobile phone cash wallet may be understood to comprise a distributed collection of computer programs and data. For example, the pre-paid mobile phone cash wallet comprises the cash wallet client 116 that is installed and executes on the pre-paid mobile phone 102, the cash wallet API/service layer 108 that is installed and executes on the server 107, and the data that constitutes the cash wallet account 118 that is stored in the data store 110. Notwithstanding this technical vision of the pre-paid mobile phone cash wallet, in some contexts it may be said that the pre-paid mobile phone 102 has a cash wallet or that a cash wallet is installed on the pre-paid mobile phone 102, which may be the customer vision or abstraction of the cash wallet.

The cash wallet client 116 may provide a user interface that the user may control to use the cash wallet. For example, the cash wallet user interface may provide a control to request to present the cash wallet funds balance. When this control is selected, the cash wallet client 116 may send a funds balance information request message to the cash wallet API/service layer 108, where the message comprises the cash wallet account identity. The cash wallet API/service layer 108 may retrieve the funds balance information from the appropriate cash wallet account 118, the cash wallet API/service layer 108 may transmit the funds balance information to the cash wallet client 116, and the cash wallet client 116 may present the funds balance information on a display of the pre-paid mobile phone 102. In an embodiment, the cash wallet API/service layer 108 may transmit the funds balance information via a short message system (SMS) text message to the pre-paid mobile phone 102.

The cash wallet user interface may further provide controls to complete a money transfer or to complete an on-line purchase transaction with an affiliated store 112 or other affiliated business. To support money transfers and/or purchase transactions, the cash wallet user interface may present transaction widgets that work with the user to perform the desired transactions. In an embodiment, the cash wallet API/service layer 108 or other component may update the transaction widgets that are presented in the user interface of the cash wallet client 116 over-the-air (OTA), via the base transceiver station 104. In an embodiment, some of the transaction widgets may be installed and/or uninstalled seasonally, for example in view of a forthcoming holiday such as Christmas or Mother's Day.

The money transfer may be completed by the cash wallet client 116 sending a funds transfer request message to the cash wallet API/service layer 108 with the funds transfer amount and an account number and/or other bank routing number information designating where the funds are to be transferred to. Alternatively, the funds transfer request message may designate another cash wallet account number to transfer the funds to. Alternatively, the funds transfer request message may designate the pre-paid mobile phone wireless communication account number, to promote transferring funds from the funds balance of the cash wallet to the funds balance of the pre-paid mobile phone wireless communication account.

When a money transfer has been completed, for example a money transfer from the funds balance of the pre-paid mobile phone cash wallet to another financial account such as a savings account or a checking account associated with a different individual than the user of the pre-paid mobile phone 102, the cash wallet API/service layer 108 decrements the funds balance of the cash wallet account 118 by the amount of money transferred as well as by an amount of a money transfer fee. The money transfer fee may be distributed among a plurality of different stake holders, for example to a money transfer enterprise, to the wallet initiation agent that initialized or set-up the cash wallet for the subject pre-paid mobile phone 102, to a pre-paid account initiation agent, and one or more others. The money transfer fee may be distributed at a settlement time, for example at an end of the day, at an end of the week, at an end of the month, at an end of the quarter, or at some other settlement interval.

The pre-paid mobile phone cash wallet may also be used to complete a transaction at a business affiliate by the user providing the cash wallet account number and an optional PIN at a point-of-sale terminal of the business affiliate. The clerk and/or the point-of-sale terminal may transmit a transaction message to a trusted service provider 114 associated with the subject business affiliate. The transaction message may comprise the amount of the transaction, the identity of the pre-paid mobile phone cash wallet (e.g., the cash wallet account number), the optional PIN, and the identity of the business affiliate. The trusted service provider 114 forwards the transaction message, possibly after pre-processing the transaction message, to the cash wallet API/service layer 108.

The cash wallet API/service layer 108 determines an amount of monetary reward or residual based on the transaction that may be distributed among a plurality of stake holders, for example to the wallet initiation agent and/or to the pre-paid account initiation agent. The cash wallet API/service layer 108 provides the purchase price of the transaction to the business affiliate at a settlement time and the monetary reward or residual to the wallet initiation agent, to the pre-paid account initiation agent, and or other stake holders at a settlement time. The settlement time for transferring money to the business affiliate for the purchased good or service may be different from the settlement time for transferring residuals and/or monetary rewards to the initiation agent, to the pre-paid account initiation agent and/or others. In an embodiment, the trusted service provider 114 and/or the store 112 may likewise receive a residual associated with the transaction.

In an embodiment, a store 112 may mediate the installation of one or more transaction widgets in the cash wallet client 116. For example, a dealer at a store 112 may upload a money transfer widget to the pre-paid mobile phone 102, for example over a WiFi wireless link, over a Bluetooth® wireless link, over a cellular wireless link, or over some other communication link including a wired or cabled link. In this case, the store 112 may send a transaction widget installation information message to the cash wallet API/service layer 108 identifying the transaction widget that is installed and the pre-paid mobile phone cash wallet account 118 associated with the installation. In an embodiment, a monetary reward may be provided to the store 112 and/or the dealer that installed the money transfer widget in the cash wallet client 116 by either the cash wallet API/service layer 108 or a trusted service provider 114. The monetary reward may be provided to the wireless service provider. A portion or a residual of the monetary reward may be provided to the wallet initiation agent and/or to the pre-paid account initiation agent.

The store 112 may promote the user loading cash into the cash wallet and/or into the cash wallet funds balance. The user may deliver cash for loading onto the cash wallet to a store 112 or a loading agent, and the loading agent may send a loading message to the cash wallet API/service layer 108 identifying the amount of cash to load to the cash wallet funds balance. In an embodiment, the loading agent is awarded a loading fee which is not represented in the amount of cash indicated in the loading message. Additionally, a residual or monetary reward funded out of the amount of cash indicated in the loading message may be provided to the wallet initiation agent and/or to the pre-paid account initiation agent. In some cases the loading agent and the wallet initiation agent are one and the same, but this is not necessarily the case. If the loading agent is the same as the wallet initiation agent, the subject agent may receive the loading fee in addition to the residual funded out of the amount of cash indicated in the loading message. The cash wallet API/service layer 108 increments the cash wallet funds balance by an appropriate amount based on the amount of cash indicated in the loading message.

In an embodiment, residuals and monetary rewards may be calculated in an event driven fashion, at the time that a cash wallet is created, at the time a transaction occurs, at the time a money transfer occurs, or at the time a loading of cash occurs. Alternatively, information about these events may be stored and accumulated, for example in the data store 110 or in another data store. These stored events may then be processed at a later time, for example during a time when the system 100 is lightly loaded, for example in early morning hours and/or over a weekend. The processing of the stored and accumulated events may be referred to in some contexts as batch processing. The batch processing of the events to determine monetary rewards and/or residuals may be organized in any fashion. For example, each event may be processed in chronological order. Alternatively, the events may first be sorted based on wallet initiation agents, and all events associated with a first wallet initiation agent are processed, then all events associated with a second wallet initiation agent are processed, and so forth.

Monetary rewards and residuals are accumulated for each of the subject initiation agents and/or pre-paid account initiation agents, and when the processing completes a single electronic money transfer may be performed to distribute the aggregated monetary rewards and/or residual to each of the subject initiation agents and/or pre-paid account initiation agents. The processing can determine the wallet initiation agent and the pre-paid account initiation agent associated with any event by association of the cash wallet account number to the cash wallet account 118 which stores the identity of the wallet initiation agent and the identity of the pre-paid account initiation agent.

Figure 2:
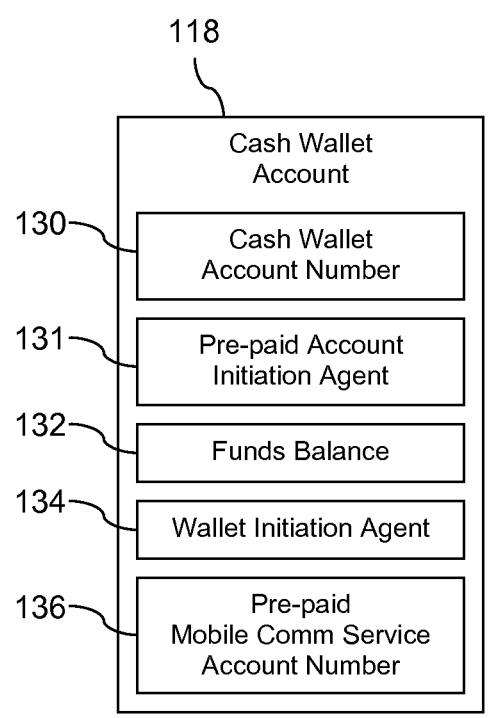
FIG. 2 is an illustration of a cash wallet account according to an embodiment of the disclosure.

Turning now to FIG. 2, further details of the cash wallet account 118 are described. In an embodiment, the cash wallet account 118 comprises a cash wallet account number 130, an identity of a pre-paid account initiation agent 131, a funds balance 132, an identity of an wallet initiation agent 134, and a pre-paid mobile communication service account number. It is understood that in other embodiments, the cash wallet account 118 may comprise either fewer or more components than described above. The cash wallet account number 130 may be a numeric account number that uniquely identifies the cash wallet account 118. The identity of the pre-paid account initiation agent 131 uniquely identifies the agent or store 112 that initiated or set up the pre-paid mobile phone communication service account. The funds balance 132 may represent the current balance of cash in the cash wallet account 118 available for transactions. The identity of the wallet initiation agent 134 uniquely identifies the agent or store 112 that initiated or set-up the pre-paid mobile phone cash wallet and/or the cash wallet account 118. The pre-paid mobile communication service account number 136 may be a numeric account number that uniquely identifies the pre-paid mobile phone communication service account that is associated with the pre-paid mobile phone 102 on which the cash wallet is installed. In some contexts it may be said that the wallet initiation agent 134 and the cash wallet account number 130 are associated, for example associated by being both associated with the same cash wallet account 118.

Figure 3:
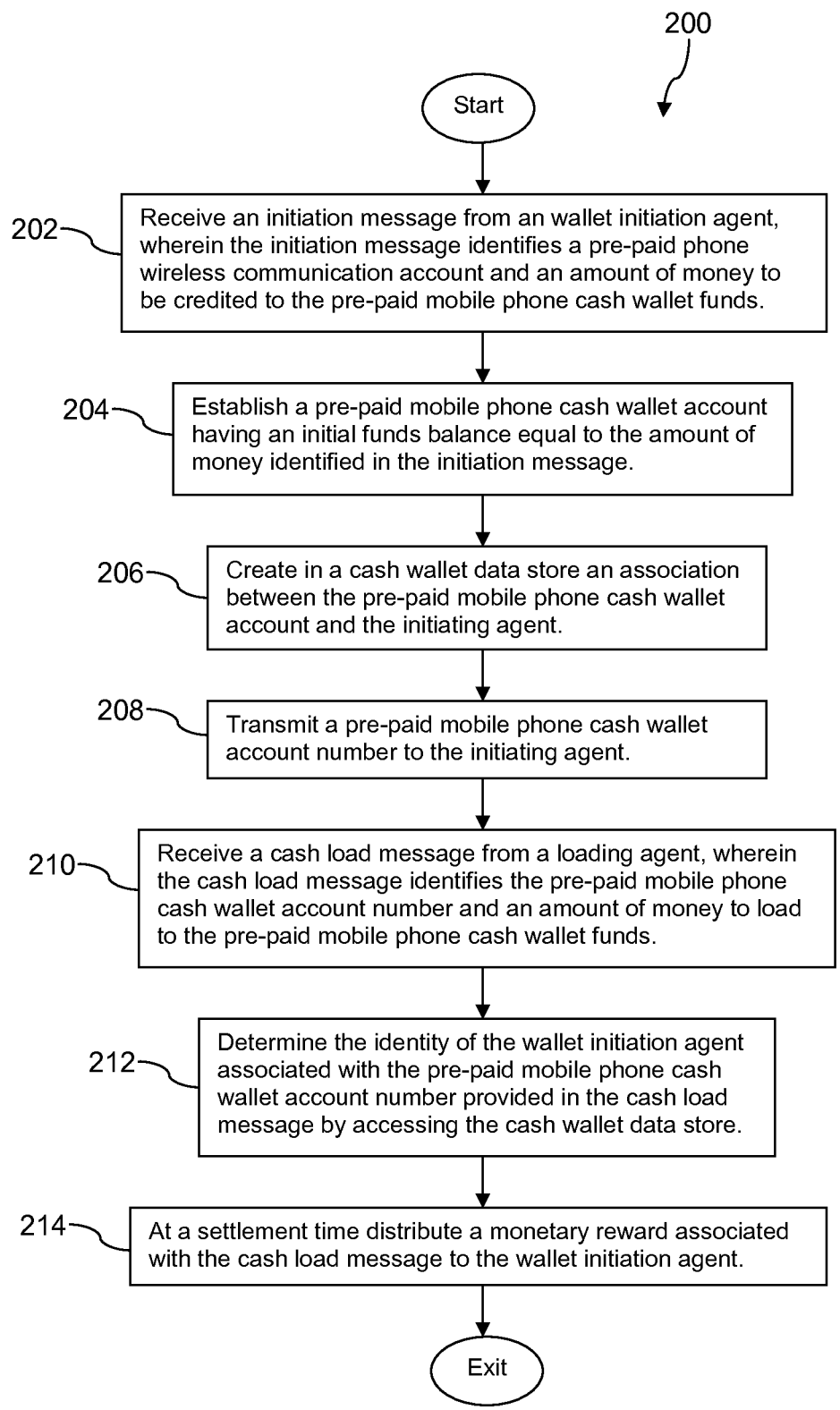
FIG. 3 if a flow chart of a method according to an embodiment of the disclosure.

Turning now to FIG. 3, a method 200 is described. At block 202, receive an initiation message from a wallet initiation agent, wherein the initiation message identifies a pre-paid mobile phone wireless communication account and an amount of money to be credited to the pre-paid mobile phone cash wallet funds balance. It is understood that the user of the pre-paid mobile phone may provide more cash to open or initiate the pre-paid mobile phone cash wallet than the amount of money to be credited to the pre-paid mobile phone case wallet funds balance, e.g., an initiation fee due to the wallet initiation agent, as described above. This may be referred to in some contexts as taking out the initiation fee on a front-end. Alternatively, the initiation fee may be taken out at a back-end of initiation. At block 204, establish a pre-paid mobile phone cash wallet account having an initial funds balance equal to the amount of money identified in the initiation message. Alternatively, if the initiation fee is to be taken out at the back-end of initiation, the initial funds balance is less than the amount of money identified in the initiation message by the amount of the initiation fee. At block 206, create in a cash wallet data store an association between the pre-paid mobile phone cash wallet account and the wallet initiation agent. The processing of block 206 may further comprise storing an association between the pre-paid account initiation agent with and the pre-paid mobile phone cash wallet account. At block 208, transmit a pre-paid mobile phone cash wallet account number to the wallet initiation agent.

At block 210, receive a cash load message from a loading agent, wherein the cash load message identifies the pre-paid mobile phone cash wallet account number and an amount of money to load to the pre-paid mobile phone cash wallet funds. At block 212, determine the identity of the wallet initiation agent associated with the pre-paid mobile phone cash wallet account number provided in the cash load message by accessing the cash wallet data store. At block 214, at a settlement time distribute a monetary reward associated with the cash load message to the wallet initiation agent. In an embodiment, method 200 may be performed by the cash wallet API/service layer 108. In an embodiment, the method 200 further comprises determining the identity of the pre-paid account initiation agent associated with the pre-paid mobile phone cash wallet account number and distributing a monetary reward or residual to the pre-paid account initiation agent at settlement time.

Figure 4:
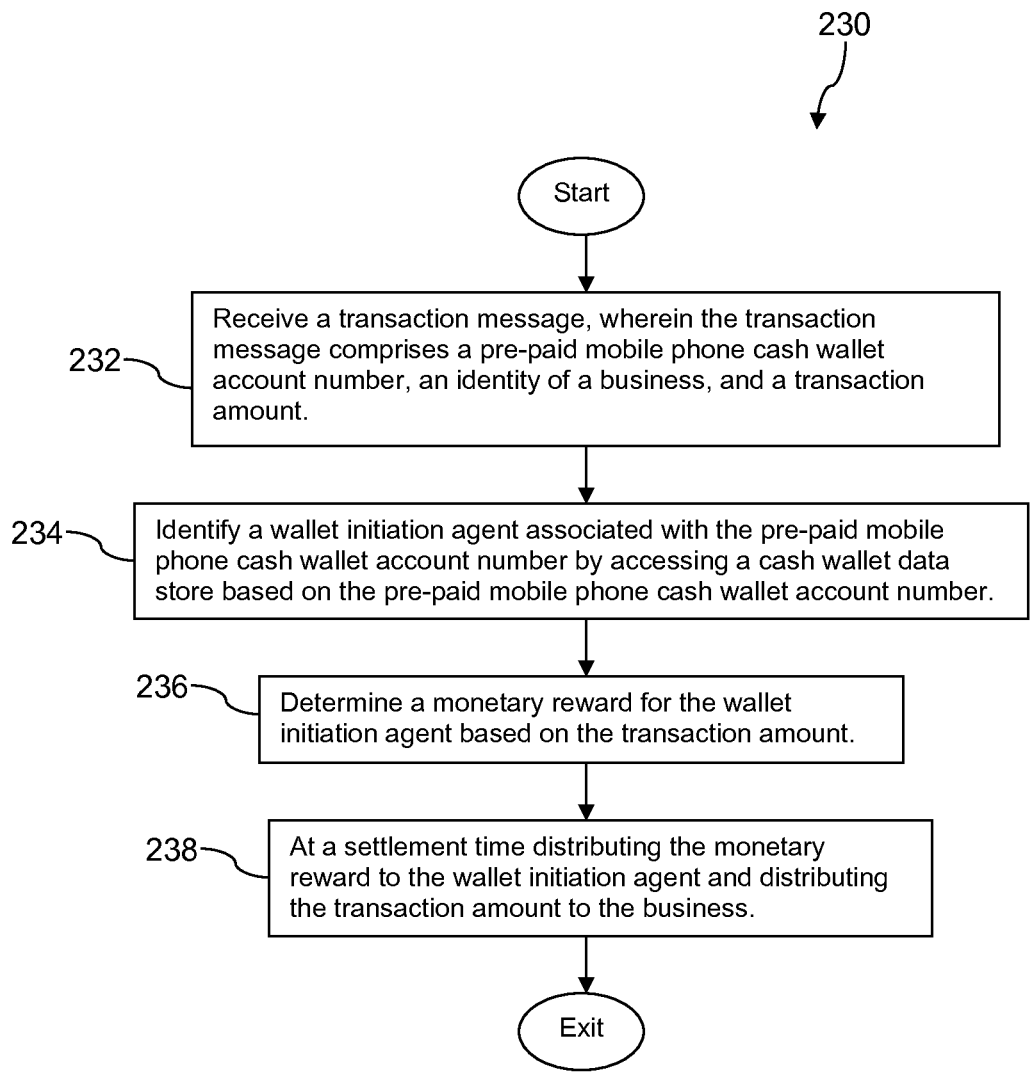
FIG. 4 is a flow chart of another method according to an embodiment of the disclosure.

Turning now to FIG. 4, a method 230 is described. At block 232, receive a transaction message, wherein the transaction message comprises a pre-paid mobile phone cash wallet account number, an identity of a business, and a transaction amount. At block 234, identify a wallet initiation agent associated with the pre-paid mobile phone cash wallet account number by accessing a cash wallet data store based on the pre-paid mobile phone cash wallet account number. At block 236, determine a monetary reward for the wallet initiation agent based on the transaction amount. At block 238, at a settlement time distributing the monetary reward to the wallet initiation agent and distributing the transaction amount to the business. As described above, the cost of the good or service that is the object of the transaction as well as the amount of the monetary reward may be deducted from the funds balance 132 of the cash wallet account 118. In an embodiment, method 230 may be performed by the cash wallet API/service layer 108. In an embodiment, the method 230 further comprises determining the identity of the pre-paid account initiation agent associated with the pre-paid mobile phone cash wallet account number and distributing a monetary reward or residual based on the transaction amount to the pre-paid account initiation agent at settlement time.

Figure 5:
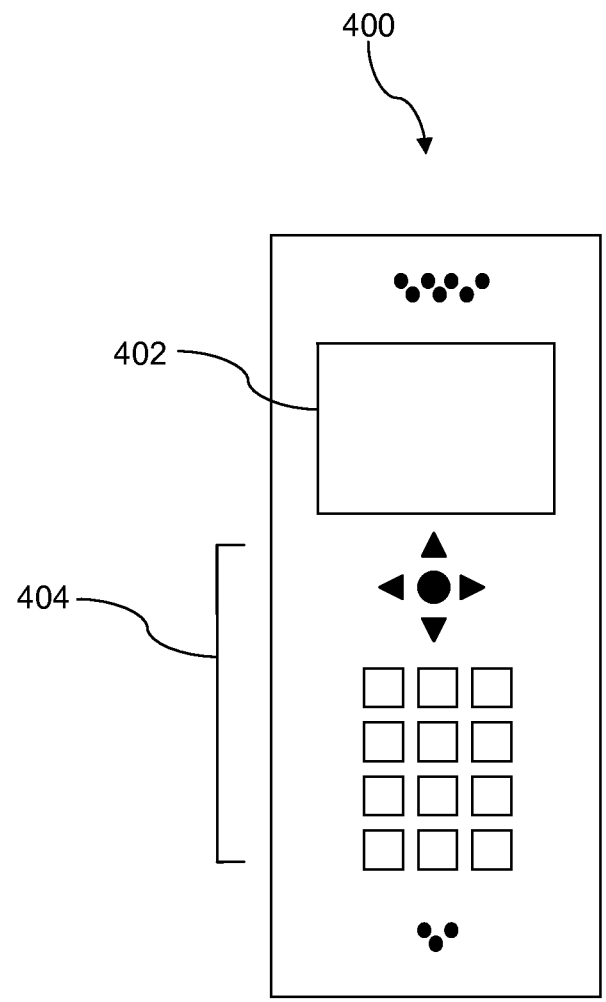
FIG. 5 is an illustration of a mobile phone according to an embodiment of the disclosure.

FIG. 5 depicts the mobile device 400, which is operable for implementing aspects of the present disclosure, but the present disclosure should not be limited to these implementations. For example, in an embodiment, the pre-paid mobile phone 102 may be implemented as the mobile device 400. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
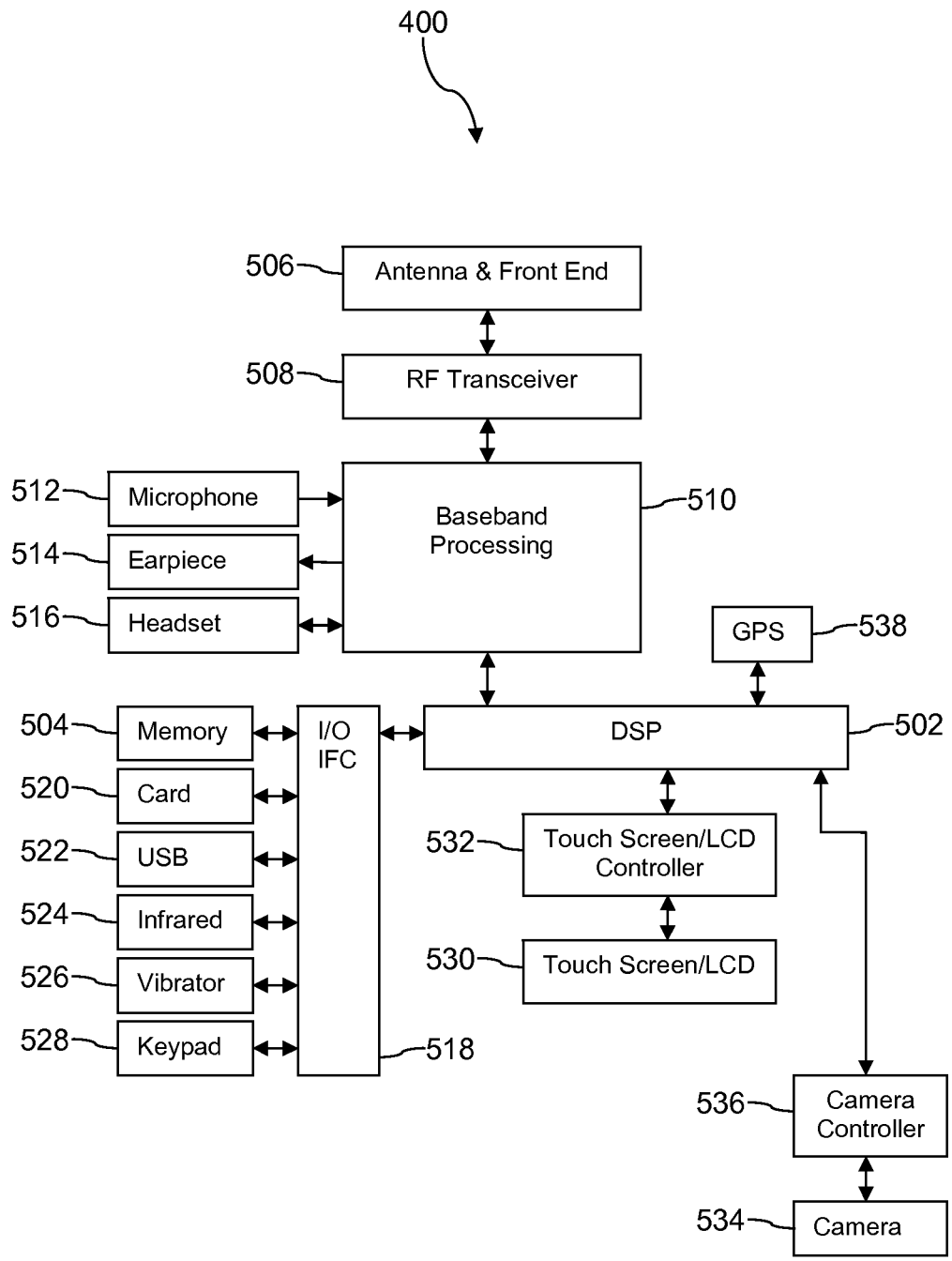
FIG. 6 is a block diagram of a hardware architecture of a mobile phone according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
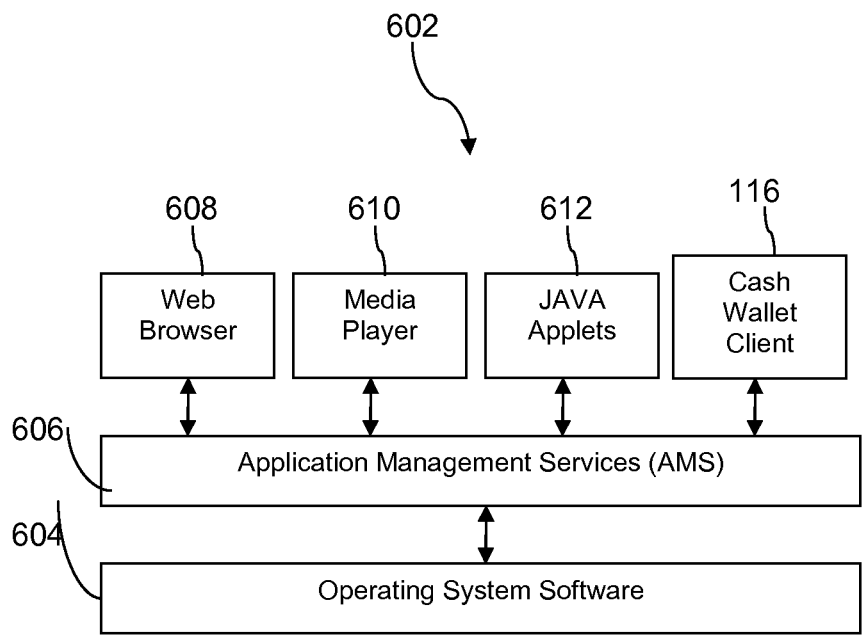
FIG. 7A is a block diagram of a software architecture of a mobile phone according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
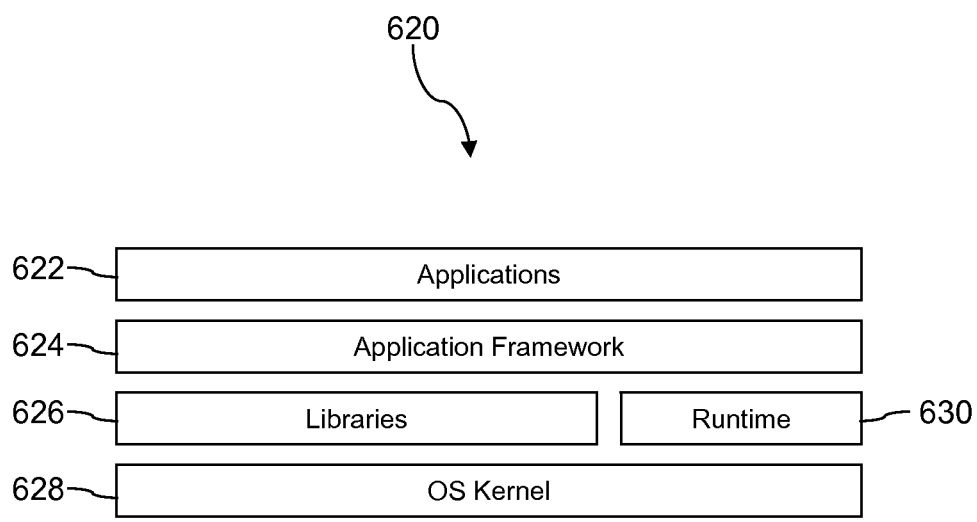
FIG. 7B is an illustration of another software architecture according to an embodiment of the disclosure.

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
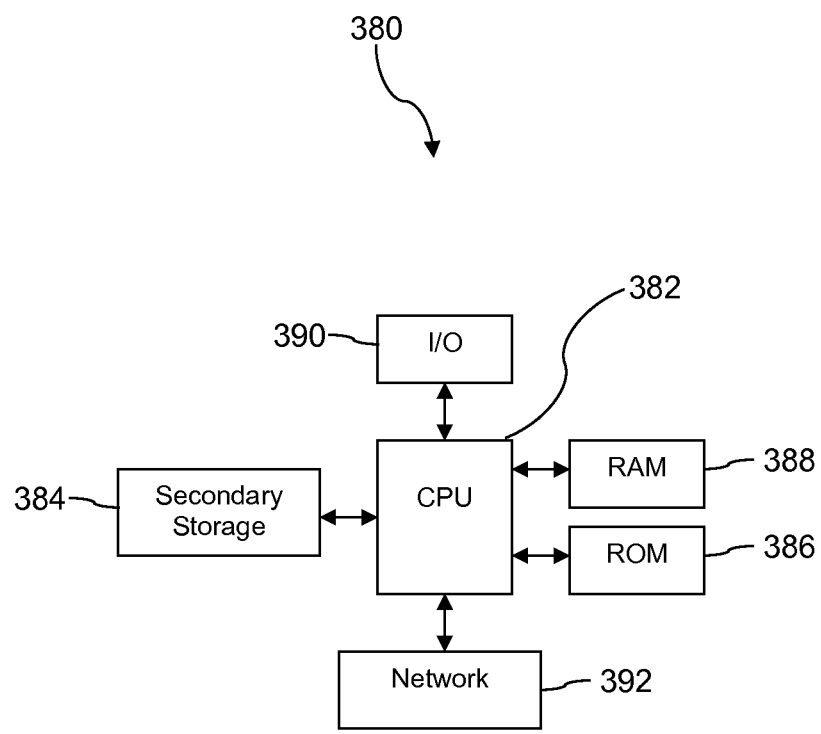
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A pre-paid mobile phone cash wallet system, comprising:
    a cash wallet server comprising:
        at least one processor;
        a non-transitory memory; and
        an application stored in the non-transitory memory that, upon execution configures the at least one processor to,
            receive an initiation message associated with a pre-paid mobile phone cash wallet from a wallet initiation agent, wherein the initiation message identifies a pre-paid wireless communication account associated with an account number, an amount of money presented, and the wallet initiation agent,
            based on the initiation message, create the pre-paid mobile phone cash wallet associated with a cash wallet account number for a pre-paid mobile phone, wherein the cash wallet account number is different from the account number associated with the pre-paid wireless communication account, and wherein a funds balance of the pre-paid mobile phone cash wallet initially comprises at least a portion of the amount of money presented and the funds balance of the pre-paid mobile phone cash wallet is independent of a funds balance of the pre-paid wireless communication account,
            associate the identity of the wallet initiation agent with the creation of the pre-paid mobile phone cash wallet, wherein the identity of the wallet initiation agent uniquely identifies an agent or store associated with the initiation message that mediates creation of the pre-paid mobile phone cash wallet,
            persist the association between the pre-paid mobile phone cash wallet and the wallet initiation agent in a cash wallet data store,
            responsive to each commercial transaction that uses the pre-paid mobile phone cash wallet with an agent that is different from the wallet initiation agent, determine a monetary reward for the wallet initiation agent based on a transaction amount of the corresponding commercial transaction with the agent that is different from the wallet initiation agent, wherein the monetary reward for the wallet initiation agent is determined for each commercial transaction while the pre-paid mobile phone cash wallet is associated with the wallet initiation agent, and
            based on the determination of the monetary reward, distribute the monetary reward to the wallet initiation agent.

2. The system of claim 1, wherein the application:
    receives a cash load message from a loading agent, wherein the cash load message identifies the pre-paid mobile phone cash wallet and a cash load amount, and wherein the cash load message is associated with a commercial transaction;
    increases the funds balance of the pre-paid mobile phone cash wallet based on the cash load amount;
    determines a load monetary reward for the loading agent based on the cash load amount; and
    determines a load residual monetary reward for the wallet initiation agent based on the cash load amount.

3. The system of claim 2, wherein the load monetary reward and the load residual monetary reward are subtracted from the cash load amount and wherein the funds balance is increased by the amount left after subtracting the load monetary reward and the load residual monetary reward from the cash load amount.

4. The system of claim 1, wherein the application:
    receives a current funds balance request message from a pre-paid mobile phone, wherein the message comprises the cash wallet account number associated with the pre-paid mobile phone cash wallet;
    looks up the funds balance of the pre-paid mobile phone cash wallet; and
    sends a funds balance information message to the pre-paid mobile phone, wherein the funds balance information message comprises an indication of the current funds balance of the pre-paid mobile phone cash wallet.

5. The system of claim 1, wherein the application:
    receives a funds transfer request message from another pre-paid mobile phone, wherein the another pre-paid mobile phone indicates a funds transfer amount and an account number; and
    transfers funds one of from the pre-paid mobile phone cash wallet to a pre-paid wireless service funds balance or from the pre-paid wireless service funds balance to the pre-paid mobile phone cash wallet.

6. The system of claim 1, wherein the application:
    receives a funds transfer request message that identifies a funds transfer amount, identifies the pre-paid mobile phone cash wallet, and identifies a second pre-paid mobile phone wallet; and
    transfers funds from the pre-paid mobile phone cash wallet funds balance to a funds balance of the second pre-paid mobile phone wallet.

7. A method of maintaining a pre-paid mobile phone cash wallet of a pre-paid mobile phone, comprising:

receiving, by a server executing at least one processer, an initiation message from a wallet initiation agent, wherein the initiation message identifies a pre-paid wireless communication account and an amount of money to be credited to a pre-paid mobile phone cash wallet funds balance of the pre-paid mobile phone cash wallet;

establishing, by the server, a pre-paid mobile phone cash wallet account associated with a pre-paid mobile phone cash wallet account number in a cash wallet data store, wherein the pre-paid mobile phone cash wallet account number is different from an account number associated with the pre-paid wireless communication account, and wherein the pre-paid mobile cash wallet account has an initial funds balance equal to the amount of money identified in the initiation message;

creating, by the server, in the cash wallet data store an association between the pre-paid mobile phone cash wallet account and the wallet initiation agent;

based on the created association, transmitting, by the server, the pre-paid mobile phone cash wallet account number to the wallet initiation agent;

receiving, by the server, a cash load message from a loading agent that is different from the wallet initiation agent, wherein the cash load message is based on a commercial transaction and identifies the pre-paid mobile phone cash wallet account number and an amount of money to load to the pre-paid mobile phone cash wallet funds balance, the pre-paid mobile phone cash wallet funds balance being independent from a funds balance of the pre-paid wireless communication account;

determining, by the server, the identity of the wallet initiation agent associated with the pre-paid mobile phone cash wallet account number provided in the cash load message by accessing the cash wallet data store, wherein the identity of the wallet initiation agent uniquely identifies an agent or store that mediates creation of the pre-paid mobile phone cash wallet of the pre-paid mobile phone;

responsive to the commercial transaction using the pre-paid mobile phone cash wallet with the loading agent that is different from the wallet initiation agent, determining, by the server, a monetary reward for the wallet initiation agent based on the cash load message, wherein monetary rewards for the wallet initiation agent including the monetary reward are determined for commercial transactions while the pre-paid mobile phone cash wallet is associated with the wallet initiation agent; and based on the determination of the monetary reward, distributing the monetary reward to the wallet initiation agent.

8. The method of claim 7, wherein the cash load message further identifies an amount of money to be distributed as a load fee.

9. The method of claim 8, wherein the monetary reward is allocated to the wallet initiation agent as a portion of the load fee responsive to the loading agent being the wallet initiation agent.

10. The method of claim 8, wherein a portion of the load fee is allocated to the loading agent.

11. The method of claim 7, further comprising:

receiving, by the server, a payment message from a service provider, wherein the payment message comprises the prepaid mobile phone cash wallet account number and a payment amount; and determining, by the server, a transaction monetary reward based on the payment amount.

12. The method of claim 11, further comprising sending a message to the pre-paid mobile phone associated with the pre-paid mobile phone cash wallet, wherein the message comprises a current funds balance.

13. A method of performing commercial transactions using a pre-paid mobile phone cash wallet of a pre-paid mobile phone, comprising:

receiving, by a server executing at least one processor, a transaction message based on a commercial transaction using the pre-paid mobile phone cash wallet with a business agent that is different from a wallet initiation agent, the transaction message comprising a pre-paid mobile phone cash wallet account number, an identity of the business agent, and a transaction amount, wherein the pre-paid mobile phone cash wallet account number is different from an account number associated with a pre-paid wireless communication account corresponding to the pre-paid mobile phone, and wherein a funds balance of the pre-paid mobile phone cash wallet is independent from a funds balance of the pre-paid wireless communication account;

identifying, by the server, the wallet initiation agent associated with the pre-paid mobile phone cash wallet account number by accessing a cash wallet data store based on the pre-paid mobile phone cash wallet account number, wherein the wallet initiation agent uniquely identifies an agent or store that mediates creation of the pre-paid mobile phone cash wallet for the pre-paid mobile phone;

responsive to the identity of the business agent not being that of the wallet initiation agent, determining, by the server, a monetary reward for the wallet initiation agent based on the transaction amount, wherein monetary rewards for the wallet initiation agent including the monetary reward are determined for commercial transactions while the pre-paid mobile phone cash wallet is associated with the wallet initiation agent; and based on determining the monetary reward, distributing, by the server, the monetary reward to the wallet initiation agent.

14. The method of claim 13, wherein the monetary reward and the transaction amount are deducted from a funds balance of the pre-paid mobile phone cash wallet identified by the pre-paid mobile phone cash wallet account number.

15. The method of claim 14, further comprising sending a funds balance message to the pre-paid mobile phone associated with the pre-paid mobile phone cash wallet.

16. The method of claim 15, wherein the funds balance message is a short message service (SMS) text message.

17. The method of claim 13, further comprising:

receiving, by the server, a wallet initiation agent transfer message, wherein the message identifies the wallet initiation agent and a second agent; and based on receiving the wallet initiation agent transfer message, associating, by the server, the pre-paid mobile phone cash wallet with the second agent.

18. The method of claim 13, wherein the business agent is associated with a money transfer business.

19. The method of claim 13, wherein the business agent is associated with a utility service provider.

* * * * *